United States Patent
Lai et al.

(10) Patent No.: US 8,963,008 B2
(45) Date of Patent: Feb. 24, 2015

(54) ELECTRODE STRUCTURE OF CAPACITIVE TOUCH PANEL

(71) Applicant: Novatek Microelectronics Corp., Hsinchu (TW)

(72) Inventors: Chih-Chang Lai, Taichung (TW); Shih-Ming Lin, Hsinchu (TW); Chih-Peng Hsia, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 180 days.

(21) Appl. No.: 13/680,114

(22) Filed: Nov. 19, 2012

(65) Prior Publication Data

US 2013/0264095 A1    Oct. 10, 2013

(30) Foreign Application Priority Data

Apr. 9, 2012   (TW) .............................. 101112457 A

(51) Int. Cl.
*H01B 1/00*        (2006.01)
*G06F 3/041*       (2006.01)

(52) U.S. Cl.
CPC . *H01B 1/00* (2013.01); *G06F 3/041* (2013.01)
USPC .................... 174/126.1; 361/679.01

(58) Field of Classification Search
USPC ........... 174/126.1; 361/679.01; 345/173–179, 345/76, 104; 200/512–517, 600
See application file for complete search history.

(56) References Cited

U.S. PATENT DOCUMENTS

| | | | |
|---|---|---|---|
| 2009/0084613 A1* | 4/2009 | Yang et al. | 178/18.06 |
| 2011/0018838 A1* | 1/2011 | Lee | 345/174 |
| 2011/0227858 A1* | 9/2011 | An et al. | 345/174 |
| 2011/0289771 A1* | 12/2011 | Kuriki | 29/829 |
| 2012/0081300 A1* | 4/2012 | Chan et al. | 345/173 |

FOREIGN PATENT DOCUMENTS

| | | |
|---|---|---|
| EP | 2385449 | 11/2011 |
| TW | 200915159 | 4/2009 |
| TW | 201145125 | 12/2011 |
| TW | 201205378 | 2/2012 |

OTHER PUBLICATIONS

"Office Action of Taiwan Counterpart Application", issued on Jul. 28, 2014, p. 1-p. 6.

* cited by examiner

*Primary Examiner* — Jenny L Wagner
*Assistant Examiner* — Michael P McFadden
(74) *Attorney, Agent, or Firm* — Jianq Chyun IP Office

(57) ABSTRACT

An electrode structure of a capacitive touch panel is provided, which includes a plurality of receiving electrodes and a plurality of driving electrodes. Each of the receiving electrodes has a hexagonal electrode structure. Each of the driving electrodes includes a main region. Each of the main regions has a quadrilateral electrode structure. The area of each driving electrode is larger than that of each receiving electrode. By using the foregoing electrode structure, the capacitive touch panel can not only provide sensing signals with less noise but also increase the intensity of input signals to enhance the signal to noise ratio.

16 Claims, 11 Drawing Sheets

ELECTRODE STRUCTURE OF CAPACITIVE TOUCH PANEL

CROSS-REFERENCE TO RELATED APPLICATION

This application claims the priority benefit of Taiwan application serial no. 101112457, filed on Apr. 9, 2012. The entirety of the above-mentioned patent application is hereby incorporated by reference herein and made a part of this specification.

BACKGROUND OF THE INVENTION

1. Field of the Invention

The invention relates to an electrode structure of a panel, and particularly relates to an electrode structure of a capacitive touch panel.

2. Description of Related Art

As the technology of touch panel develops, touch panels become widely used as the screens of electronic devices, such as mobile phones, laptop computers, and tablet computers. Touch panels allow the user to input or operate the electronic devices more conveniently and make the interface more user-friendly and convenient.

Generally speaking, the electrode structure of a capacitive touch panel includes multiple receiving electrodes and multiple driving electrodes. In terms of actual application, the driving electrodes are used to receive the driving signals inputted by the panel controller, so as to drive the touch panel to sense the touch of the user. The receiving electrodes are used to generate sensing signals corresponding to the user's touch. In the conventional technology, the structures of the receiving electrodes and the driving electrodes are usually designed to have the same shape and equal size. Such a design can generate stronger sensing signals. However, as the region area of the receiving electrodes increases, more noise is sensed.

SUMMARY OF THE INVENTION

The invention provides an electrode structure of a capacitive touch panel, which not only provides sensing signals with less noise but also increases the intensity of input signals to enhance a signal to noise ratio (SNR).

The invention provides an electrode structure of a capacitive touch panel, and the electrode structure includes a plurality of receiving electrodes and a plurality of driving electrodes. Each of the receiving electrodes has a hexagonal electrode structure. Each of the driving electrodes includes a main region. Each of the main regions has a quadrilateral electrode structure. Herein, the area of each driving electrode is larger than the area of each receiving electrode.

According to an embodiment of the invention, sides of each hexagonal electrode structure, which are arranged in the same direction, are substantially parallel.

According to an embodiment of the invention, sides of each quadrilateral electrode structure, which are arranged in the same direction, are substantially parallel.

According to an embodiment of the invention, each of the four included angles of each quadrilateral electrode structure is substantially equal to 90 degrees.

According to an embodiment of the invention, the sides of the hexagonal electrode structure and the sides of the quadrilateral electrode structure, which are arranged in the same direction, are substantially parallel.

According to an embodiment of the invention, each hexagonal electrode structure has a plurality of long sides and a plurality of short sides. In each hexagonal electrode structure, an included angle between the adjacent short sides is smaller than or equal to 90 degrees.

According to an embodiment of the invention, in each hexagonal electrode structure, an included angle between the adjacent long side and short side is larger than 90 degrees.

According to an embodiment of the invention, the electrode structure further includes a plurality of dummy electrodes. Each of the dummy electrodes has a trilateral electrode structure. The area of each dummy electrode is smaller than the area of each receiving electrode and the area of each driving electrode.

According to an embodiment of the invention, the sides of the hexagonal electrode structure, the sides of the quadrilateral electrode structure, and the sides of the trilateral electrode structure, which are arranged in the same direction, are substantially parallel.

According to an embodiment of the invention, the sides of each trilateral electrode structure, which are arranged in the same direction, are substantially parallel.

According to an embodiment of the invention, an included angle between two adjacent sides of each trilateral electrode structure is substantially equal to 90 degrees.

According to an embodiment of the invention, the trilateral electrode structures are respectively insulated from the hexagonal electrode structures and the quadrilateral electrode structures.

According to an embodiment of the invention, each driving electrode further includes a plurality of auxiliary regions. Each auxiliary region has a trilateral electrode structure.

According to an embodiment of the invention, the sides of the trilateral electrode structure, which are arranged in the same direction, are substantially parallel.

According to an embodiment of the invention, the sides of the trilateral electrode structure and the sides of the quadrilateral electrode structure, which are arranged in the same direction, are substantially parallel.

According to an embodiment of the invention, an included angle between two adjacent sides of each trilateral electrode structure is substantially equal to 90 degrees.

Based on the above, in the exemplary embodiments of the invention, the area of the receiving electrodes in the receiving region is reduced to decrease the noise of sensing signals. In the driving region, the area for the coupling of the driving electrodes and the receiving electrodes is increased to enhance the intensity of the input signals and further to improve the signal to noise ratio.

In order to make the aforementioned features and advantages of the invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 1:
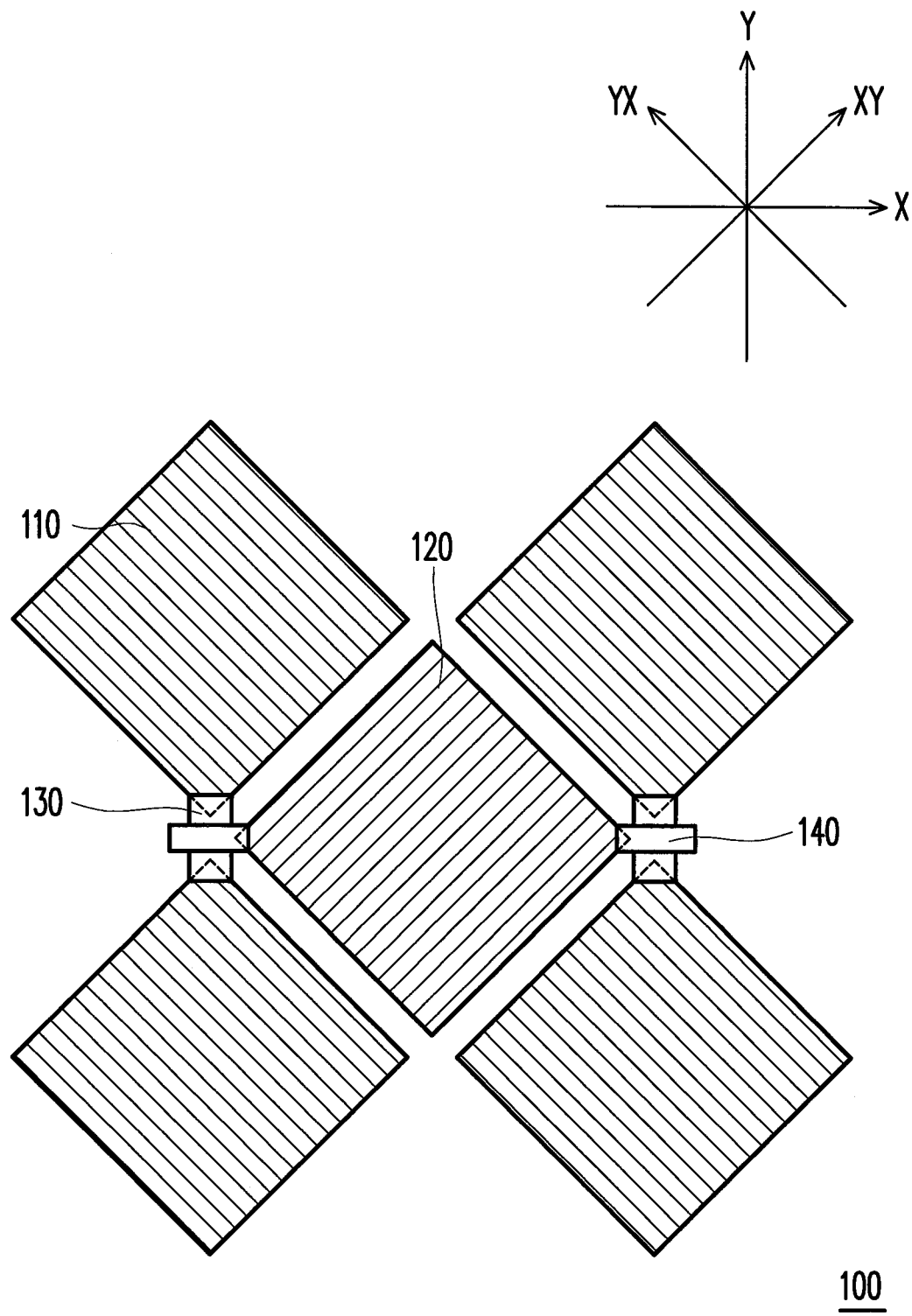
FIG. 1 is a schematic view of an electrode structure of a capacitive touch panel.

FIG. 1 is a schematic view of an electrode structure of a capacitive touch panel. Referring to FIG. 1, an electrode pattern 100 includes a plurality of receiving electrodes 110 that are longitudinally arranged and a plurality of driving electrodes 120 that are transversely arranged. The formation of the electrode pattern 100 requires a dual-layer stack structure or a single-layer structure. In the electrode pattern 100 having the single-layer structure, a longitudinal electric bridge 130 is disposed to electrically connect the receiving electrodes 110 in a longitudinal column. Multiple columns of the receiving electrodes 110 form a receiving area of the touch panel. In the electrode pattern 100, a transverse electric bridge 140 is further disposed to electrically connect the driving electrodes 120 in a transverse row. Multiple rows of the driving electrodes 120 form a driving area of the touch panel. In this embodiment, the receiving area and the driving area respectively have a rhombic electrode structure that has equal area.

First Embodiment

Figure 2A:
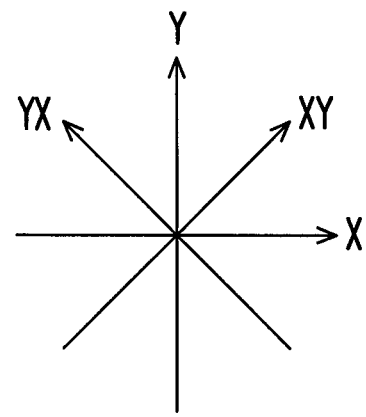
FIG. 2A to FIG. 2C are schematic views illustrating an electrode structure of a capacitive touch panel according to an embodiment of the invention.
Figure 2A:
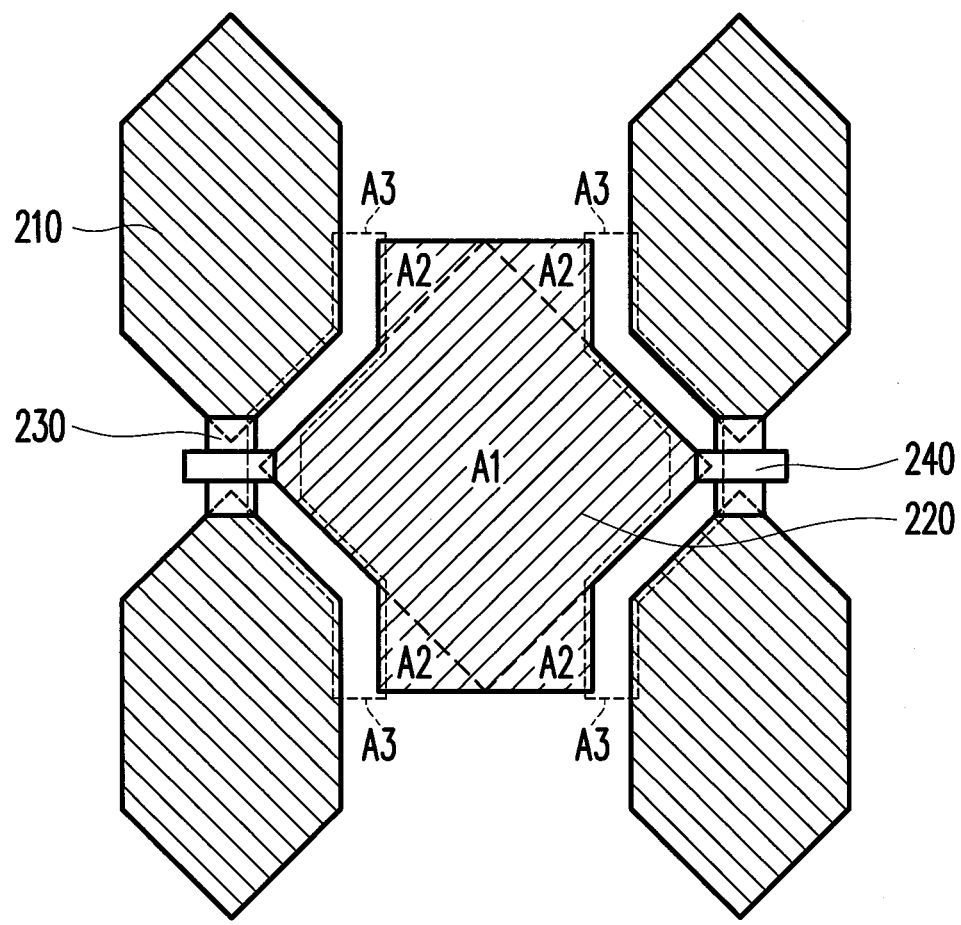
Figure 2B:
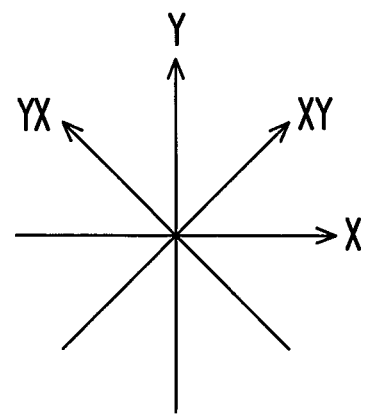
Figure 2B:
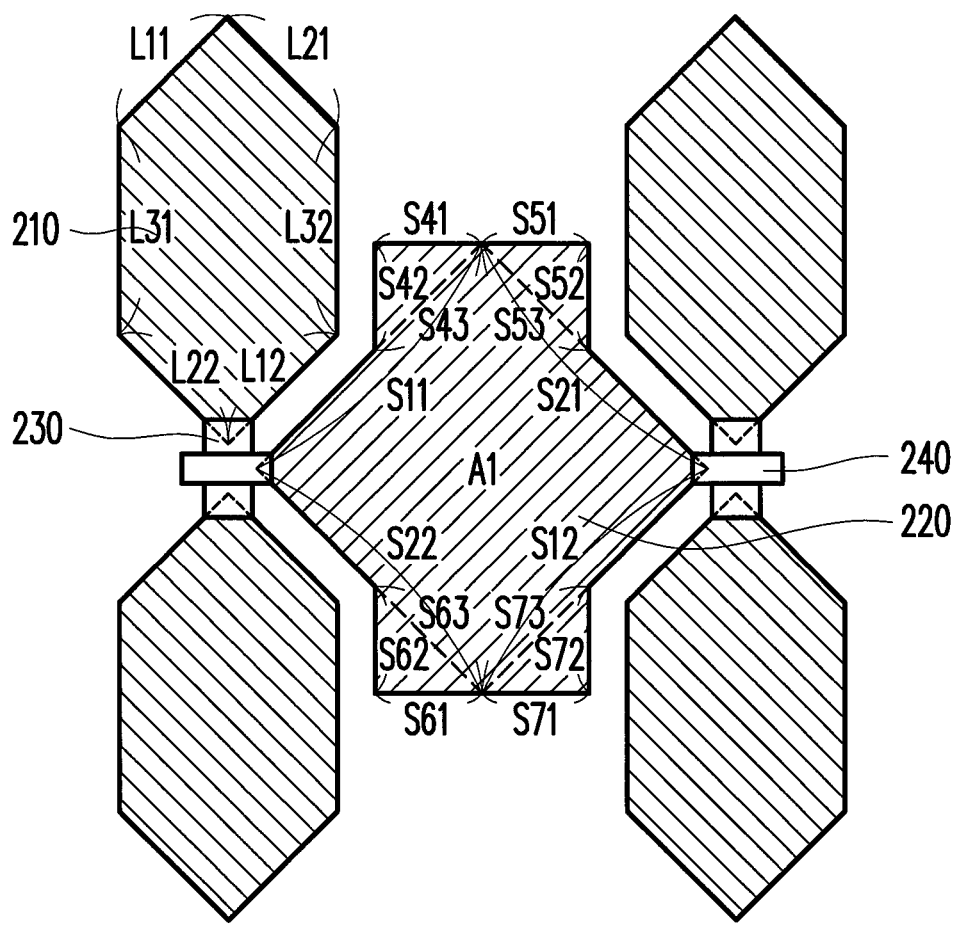
Figure 2C:
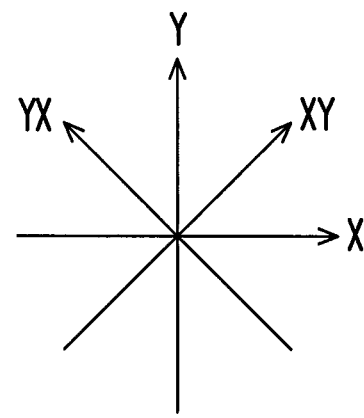
Figure 2C:
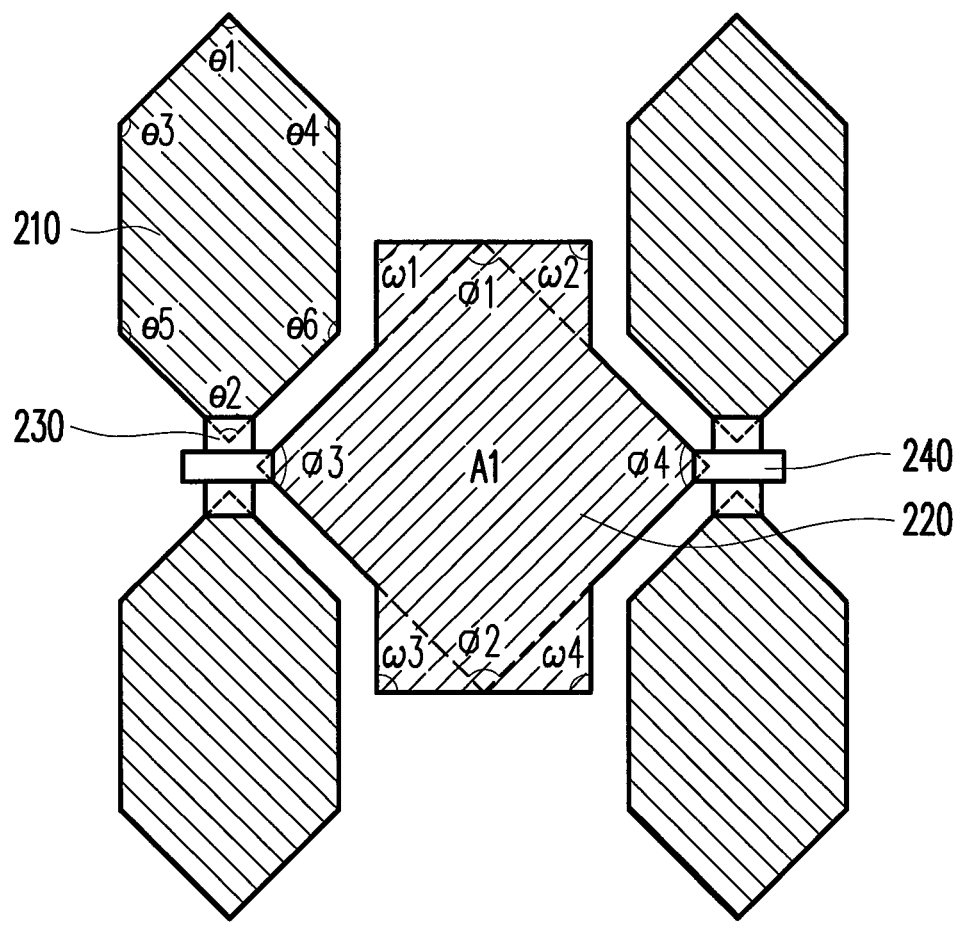

FIG. 2A to FIG. 2C are schematic views illustrating an electrode structure of a capacitive touch panel according to an embodiment of the invention. With reference to FIG. 2A to FIG. 2C, an electrode pattern 200 of a touch panel according to this embodiment includes a plurality of receiving electrodes 210, a plurality of driving electrodes 220, a plurality of longitudinal electric bridges 230, and a plurality of transverse electric bridges 240. The longitudinal electric bridges 230 are configured to electrically connect the receiving electrodes 210 in the same column. The transverse electric bridges 240 are configured to electrically connect the driving electrodes 220 in the same row. In this embodiment, each of the receiving electrodes 210 and each of the driving electrodes 220 are insulated from each other. In addition, the area of each driving electrode 220 is larger than the area of each receiving electrode 210. Each of the receiving electrodes 210 has a hexagonal electrode structure. Each of the driving electrodes 220 includes a main region A1 and a plurality of auxiliary regions A2. The main region A1 has a quadrilateral electrode structure. Each of the auxiliary regions A2 has a trilateral electrode structure.

To be more specific, one of the receiving electrodes 210 which has the hexagonal electrode structure is described below as an example. In terms of the arrangement of opposite sides, referring to FIG. 2B, the hexagonal electrode structure has three pairs of opposite sides, which are respectively arranged in three different directions, namely X, XY, and YX. Each pair of the opposite sides is substantially parallel in the corresponding direction. For example, in the YX direction, the opposite sides L11 and L12 are substantially parallel to each other; in the XY direction, the opposite sides L21 and L22 are substantially parallel to each other; and in the X direction, the opposite sides L31 and L32 are substantially parallel to each other.

From the aspect of angles, referring to FIG. 2C, an included angle θ1 between the two short sides L11 and L21 of the hexagonal electrode structure is substantially equal to an included angle θ2 between the two short sides L22 and L12. In addition, the included angles θ3 to θ6 respectively between the long side and the short side are substantially equal to each other. However, it is noted that the invention is not limited thereto. Moreover, in this embodiment, the included angle θ1 and θ2 is smaller than or substantially equal to 90 degrees. Each of the included angles θ3 to θ6 is an obtuse angle, which is larger than 90 degrees.

This exemplary embodiment illustrates that the hexagonal electrode structure of each receiving electrode 210 has three pairs of opposite sides that are substantially parallel in different directions as an example. However, the invention is not limited thereto. In other embodiments of the invention, the hexagonal electrode structure may have a pair of opposite sides that are not parallel to each other in a direction. In the embodiments that the opposite sides are not parallel, the included angles formed by the sides of the hexagonal electrode structure may vary. Thus, the invention does not limit the included angles to certain values.

From the aspect of sizes, when compared with the area of the rhombic receiving electrode 110 shown in FIG. 1, the area of the receiving electrode 210 of the hexagonal electrode structure described in this embodiment is relatively small, and thus the noise of a sensing signal thereof is reduced. In addition, in comparison with the area of the driving electrode 220 of this embodiment, the area of the receiving electrode 210 is also relatively small.

Further, the following describes one of the driving electrodes 220 as an example. Referring to FIG. 2A, the driving electrode 220 includes a main region A1 and a plurality of auxiliary regions A2. The main region A1 is a quadrilateral electrode structure. In terms of the arrangement of opposite sides, referring to FIG. 2B, the quadrilateral electrode structure of the main region A1 has two pairs of opposite sides, which are respectively arranged in two different directions, namely XY and YX. Each pair of the opposite sides is substantially parallel in the corresponding direction. For example, in the YX direction, the opposite sides S11 and S12 are substantially parallel to each other; and in the XY direction, the opposite sides S21 and S22 are substantially parallel to each other. In this embodiment, lengths of the four sides S11, S12, S21, and S22 of the main region A1 are substantially equal to or different from each other. The invention does not limit the lengths to certain values. In one embodiment that the lengths of the four sides S11, S12, S21, and S22 of the main region A1 are substantially equal, the driving electrode 220 is a rhombic electrode structure.

From the aspect of angles, referring to FIG. 2C, an included angle φ1 of the main region A1 of this embodiment is substantially equal to an included angle φ2, and an included angle φ3 is substantially equal to an included angle φ4, but the invention is not limited thereto. In other embodiments of the invention, the included angles φ1 to φ4 formed by the four sides S11, S12, S21, and S22 of the main region A1 are substantially equal to each other, and are substantially equal to 90 degrees respectively.

In addition, with reference to FIG. 2A, in this embodiment, the driving electrode 220 further includes four auxiliary regions A2, which have substantially the same area. It is noted that the aforementioned number and size relationship of the auxiliary regions A2 should not be construed as limitations to the invention. In this embodiment, each of the auxiliary regions A2 is a trilateral electrode structure. In terms of the arrangement of sides, referring to the four auxiliary regions A2 depicted in FIG. 2B, the sides of the four auxiliary regions A2 are substantially parallel in different directions. In other words, in the Y direction, the adjacent sides S41, S51, S61, and S71 of the four auxiliary regions A2 are substantially parallel to each other; in the X direction, the adjacent sides S42, S52, S62, and S72 of the four auxiliary regions A2 are substantially parallel to each other; in the XY direction, the oblique sides S53 and S63 are substantially parallel to each other; and in the YX direction, the oblique sides S43 and S73 are substantially parallel to each other. In this embodiment, lengths of the eight adjacent sides S41, S51, S61, S71, S42, S52, S62, and S72 of the auxiliary regions A2 are substantially equal to or different from each other; and lengths of the four oblique sides S43, S53, S63, and S73 of the auxiliary regions A2 are substantially equal to or different from each other. The invention does not limit these lengths.

From the aspect of angles, in the four auxiliary regions A2 illustrated in FIG. 2C, an included angle $\omega 1$ between the adjacent sides S41 and S42, an included angle cot between the adjacent sides S51 and S52, an included angle $\omega 3$ between the adjacent sides S61 and S62, and an included angle $\omega 4$ between the adjacent sides S71 and S72 are substantially equal to or different from each other. In one embodiment that the included angles $\omega 1$ to $\omega 4$ are equal to each other, the included angles are substantially equal to 90 degrees for example, but the invention is not limited thereto.

From the aspect of sizes, when compared with the area of the rhombic driving electrode 120 of FIG. 1, the area of the driving electrode 220 of the polygonal structure of this embodiment is relatively large, and the driving electrode 220 has more sides. Therefore, a coupling region A3 between the driving electrode 220 and the receiving electrode 210 is larger. The larger coupling area effectively increases the intensity of the input signals and improves the signal to noise ratio. In addition, the structure of the driving electrode 220 includes the main region A1 and the auxiliary regions A2 located on a top side and a bottom side of the main region A1. Therefore, in comparison with the area of the receiving electrode 210 of this embodiment, the area of the driving electrode 220 is relatively large. It is noted that the driving electrode 220 is divided into the main region A1 and the auxiliary regions A2 in this exemplary embodiment; however, in the actual fabrication, each of the driving electrodes 220 is an integrally-formed polygonal structure, and the main region A1 and the auxiliary regions A2 are not fabricated separately.

Figure 3:
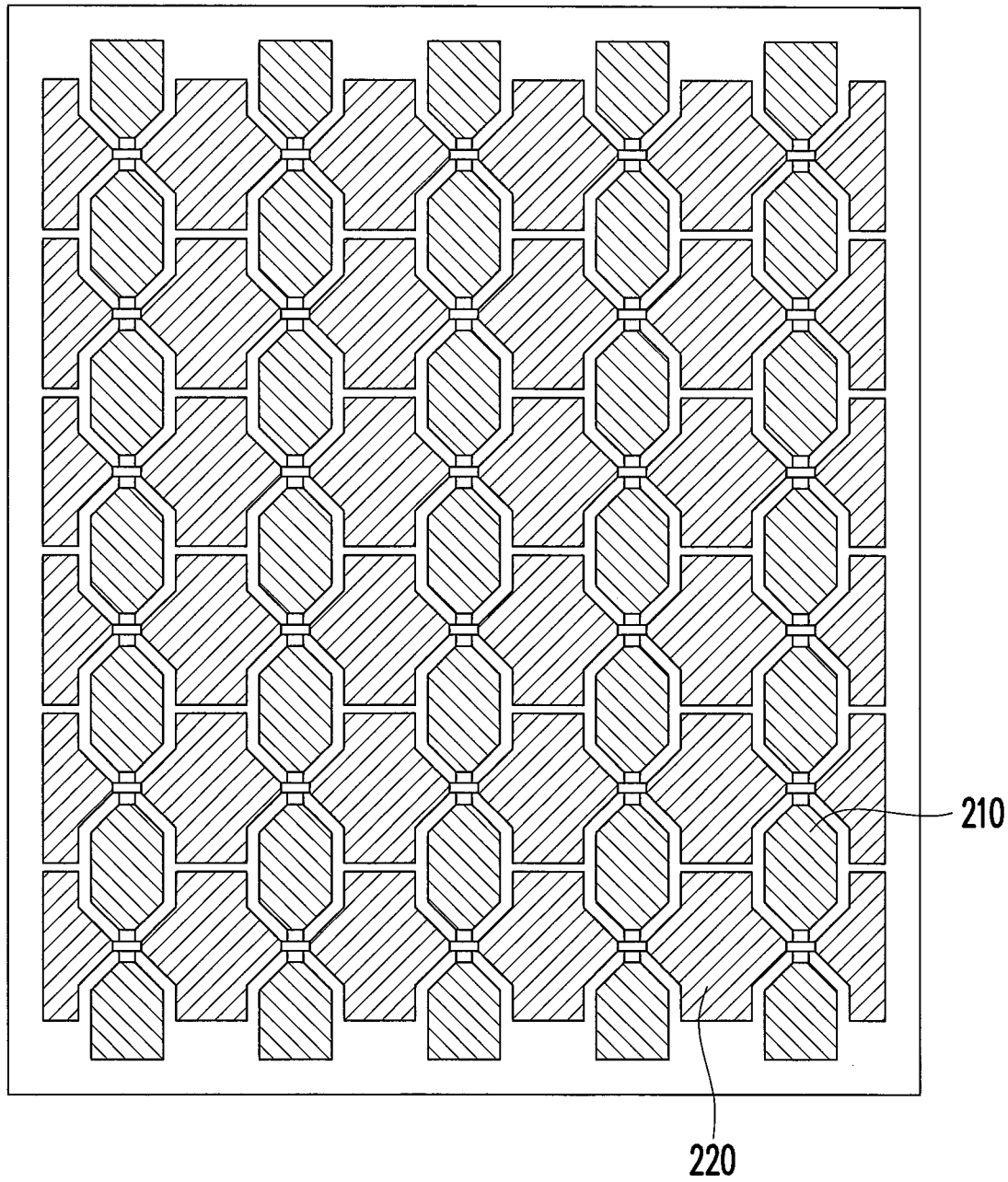
FIG. 3 is a schematic view of the electrode structure of FIG. 2A applied on a capacitive touch panel.

FIG. 3 is a schematic view of the electrode structure of FIG. 2A applied on a capacitive touch panel. Referring to FIG. 3, FIG. 3 depicts a capacitive touch panel that includes a group of 5×6 electrodes. The electrodes are divided into two regions, which are a driving region including a plurality of the driving electrodes 220 and a receiving region including a plurality of the receiving electrodes 210. In the driving region, six polygonal driving electrodes 220 are provided in a column as an example. The polygonal structure of each of the driving electrodes 220 is the same as the structure of the driving electrode 220 illustrated in FIG. 2A, and thus descriptions thereof are omitted hereinafter. In the receiving region, five hexagonal receiving electrodes 210 are provided in a row as an example. The hexagonal electrode structure of each of the receiving electrodes 210 is the same as the structure of the receiving electrode 210 illustrated in FIG. 2A, and thus descriptions thereof are omitted hereinafter. In this embodiment, the structure of the driving electrode in the driving region includes the main region A1 and the auxiliary regions A2 located on the top and the bottom sides of the main region A1, so as to increase the coupling region A3 with the receiving electrodes 210. The area of the receiving electrode in the receiving region is reduced so as to decrease the noise of sensing signals.

Second Embodiment

Figure 4A:
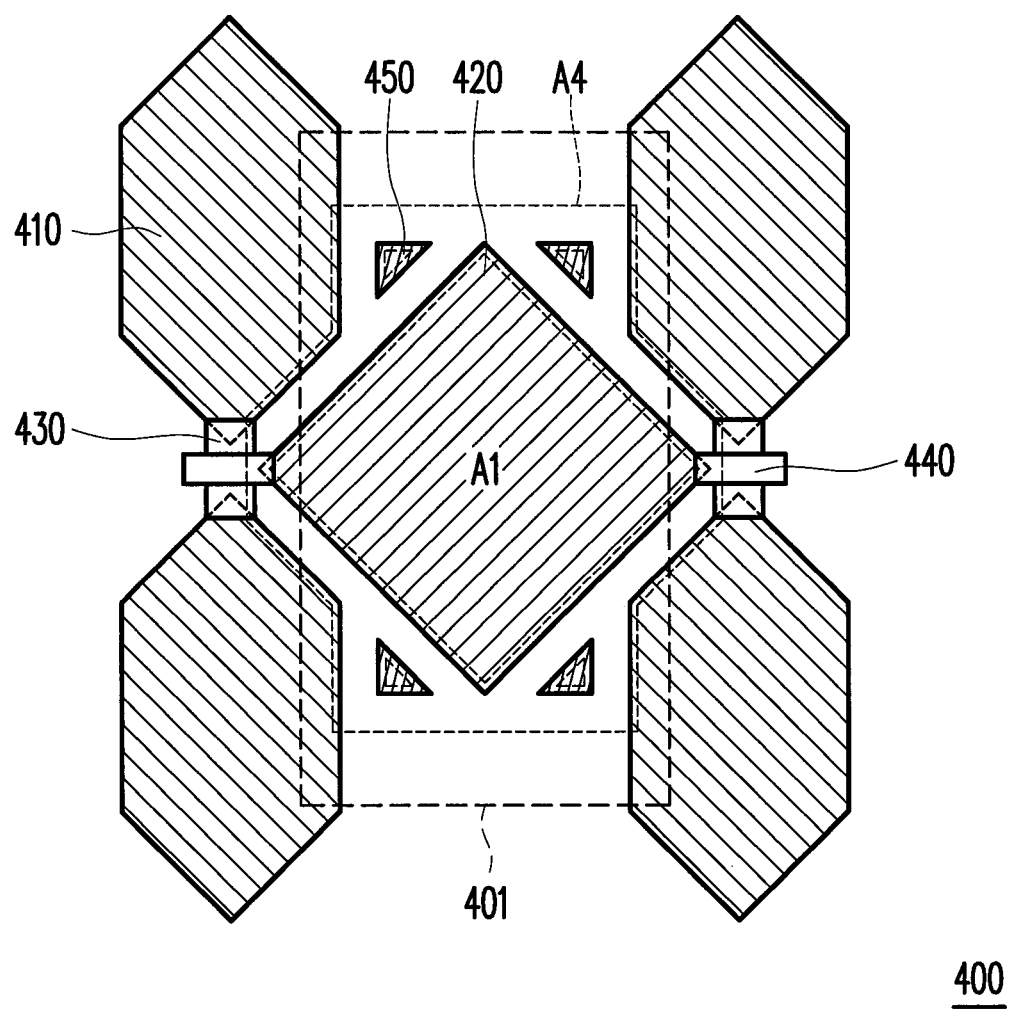
FIG. 4A is a schematic view of an electrode structure of a capacitive touch panel according to an embodiment of the invention.
Figure 4B:
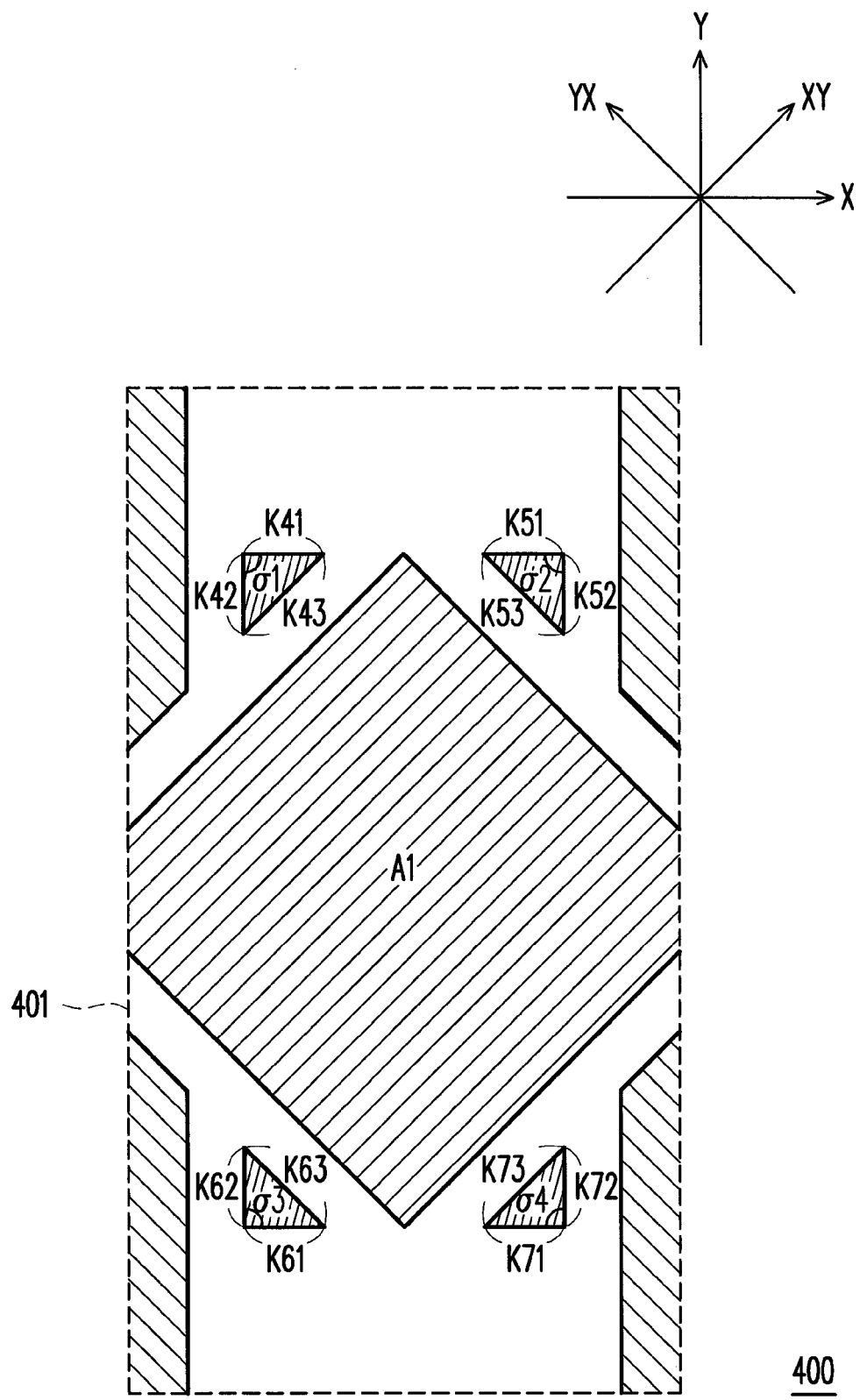
FIG. 4B is an enlarged schematic view of a region of the electrode structure of FIG. 4A.

FIG. 4A is a schematic view of an electrode structure of a capacitive touch panel according to an embodiment of the invention. FIG. 4B is an enlarged schematic view of a region of the electrode structure of FIG. 4A. With reference to FIG. 2A and FIG. 4A to FIG. 4B, an electrode pattern 400 of the touch panel of this embodiment is similar to the electrode pattern 200 of the first embodiment, and the differences between the electrode pattern 400 and the electrode pattern 200 lie in that the electrode pattern 400 further includes a plurality of dummy electrodes 450, and a driving electrode 420 only has the main region A1. The main region A1 of the driving electrode 420 has the same structure as the main region A1 of the driving electrode 220 of the first embodiment, and thus descriptions thereof are omitted hereinafter. An electrode structure of the dummy electrode 450 of this embodiment is explained below.

More specifically, the electrode pattern 400 of this embodiment includes four dummy electrodes 450 that have substantially equal sizes, and the dummy electrodes 450 are disposed on a top side and a bottom side of the driving electrode 420. It is noted that the aforementioned number and size relationship of the dummy electrodes 450 should not be construed as limitations to the invention. In addition, the aforementioned top side and bottom side of this embodiment are to describe the directions shown in the figures, which should not be construed as limitations to the invention. Each of the dummy electrodes 450 of this embodiment has a trilateral electrode structure, and the area of each dummy electrode 450 is respectively smaller than the area of each receiving electrode 410 and the area of each driving electrode 420. Moreover, the dummy electrodes 450 are respectively insulated from the receiving electrodes 410 and the driving electrodes 420. The dummy electrodes 450 are disposed at least for increasing a coupling region A4, as shown in FIG. 4A, between the receiving electrodes 410, the driving electrodes 420, and the dummy electrodes 450.

In terms of the arrangement of sides, referring to FIG. 4B, FIG. 4B provides an enlarged schematic view of a region 601 of the electrode pattern 400. With reference to the four dummy electrodes 450, the sides of the four dummy electrodes, which are arranged in different directions, are substantially parallel in different directions. For example, in the Y direction, the adjacent sides K41, K51, K61, and K71 of the four dummy electrodes 450 are substantially parallel to each other; in the X direction, the adjacent sides K42, K52, K62, and K72 of the four dummy electrodes 450 are substantially parallel to each other; in the XY direction, the oblique sides K53 and K63 are substantially parallel to each other; and in the YX direction, the oblique sides K43 and K73 are substantially parallel to each other. In this embodiment, lengths of the eight adjacent sides K41, K51, K61, K71, K42, K52, K62, and K72 of the dummy electrodes 450 are substantially equal to or different from each other; and lengths of the four oblique sides K43, K53, K63, and K73 of the dummy electrodes 450 are substantially equal to or different from each other. The invention does not limit these lengths.

From the aspect of angles, in the four dummy electrodes 450, an included angle σ1 between the adjacent sides K41 and K42, an included angle σ2 between the adjacent sides K51 and K52, an included angle σ3 between the adjacent sides K61 and K62, and an included angle σ4 between the adjacent sides K71 and K72 are substantially equal to or different from each other. In the embodiment that the included angles σ1 to σ4 are equal to each other, the included angles are substantially equal to 90 degrees for example, but the invention is not limited thereto.

Figure 5:
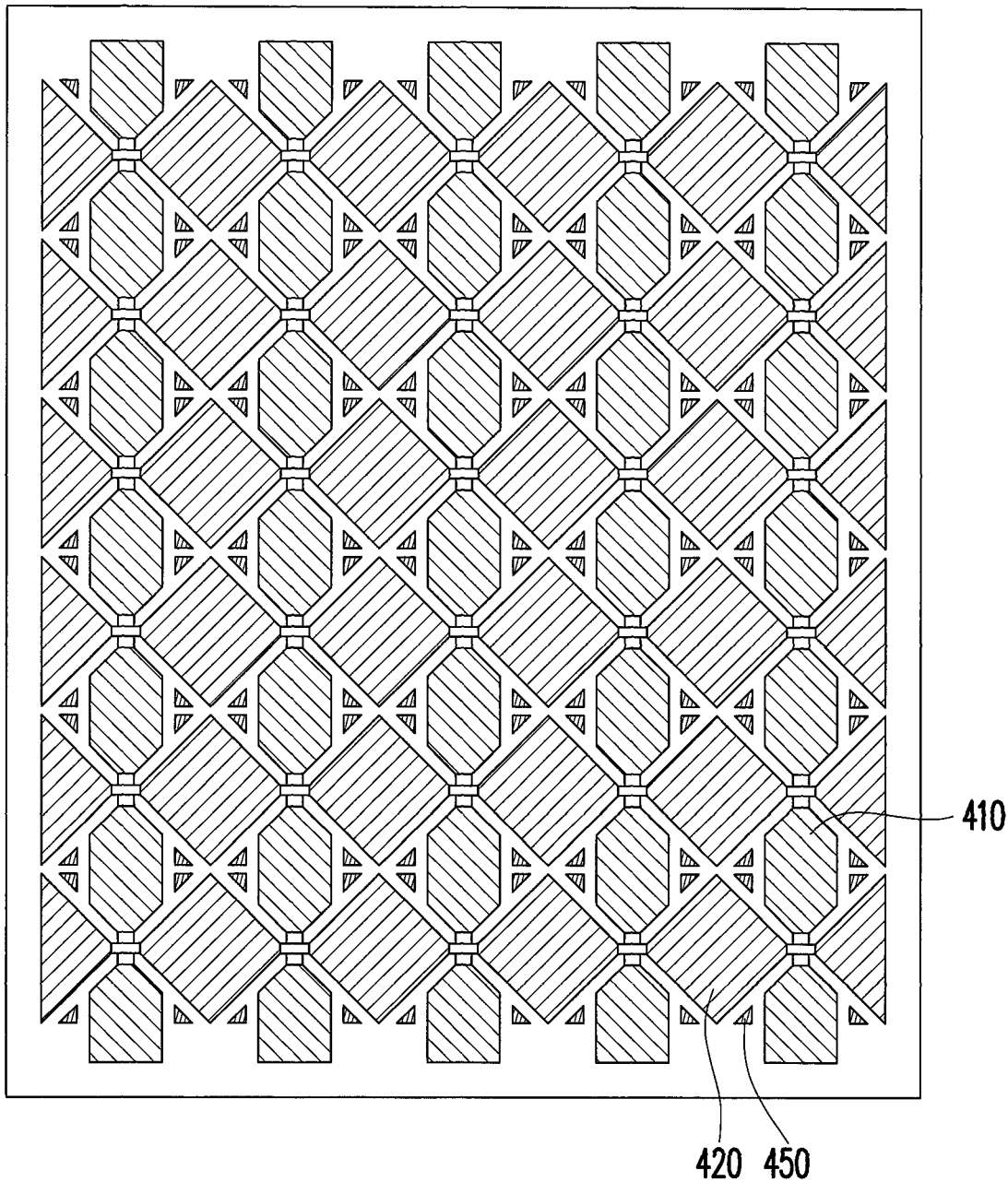
FIG. 5 is a schematic view of the electrode structure of FIG. 4A applied on a capacitive touch panel.

FIG. 5 is a schematic view of the electrode structure of FIG. 4A applied on a capacitive touch panel. Referring to FIG. 5, FIG. 5 depicts a capacitive touch panel that includes a group of 5×6 electrodes. The electrodes are divided into two regions, which are a driving region including a plurality of the driving electrodes 420 and a receiving region including a plurality of the receiving electrodes 410. In the driving region, six polygonal driving electrodes 420 are provided in a column as an example. The polygonal structure of each of the driving electrodes 420 is the same as the structure of the driving electrode 420 illustrated in FIG. 4A, and thus descriptions thereof are omitted hereinafter. In the receiving region, five hexagonal receiving electrodes 410 are provided in a row as an example. The hexagonal electrode structure of each of the receiving electrodes 410 is the same as the structure of the receiving electrode 410 illustrated in FIG. 4A, and thus descriptions thereof are omitted hereinafter. In this embodiment, each of the driving electrodes 420 has a rhombic electrode structure, for example, and two pairs of the dummy electrodes 450 are respectively disposed on the top side and the bottom side of the driving electrode 420, so as to increase the coupling region A4 with the receiving electrodes 410. The area of the receiving electrode in the receiving region is reduced so as to decrease the noise of sensing signals.

Third Embodiment

Figure 6A:
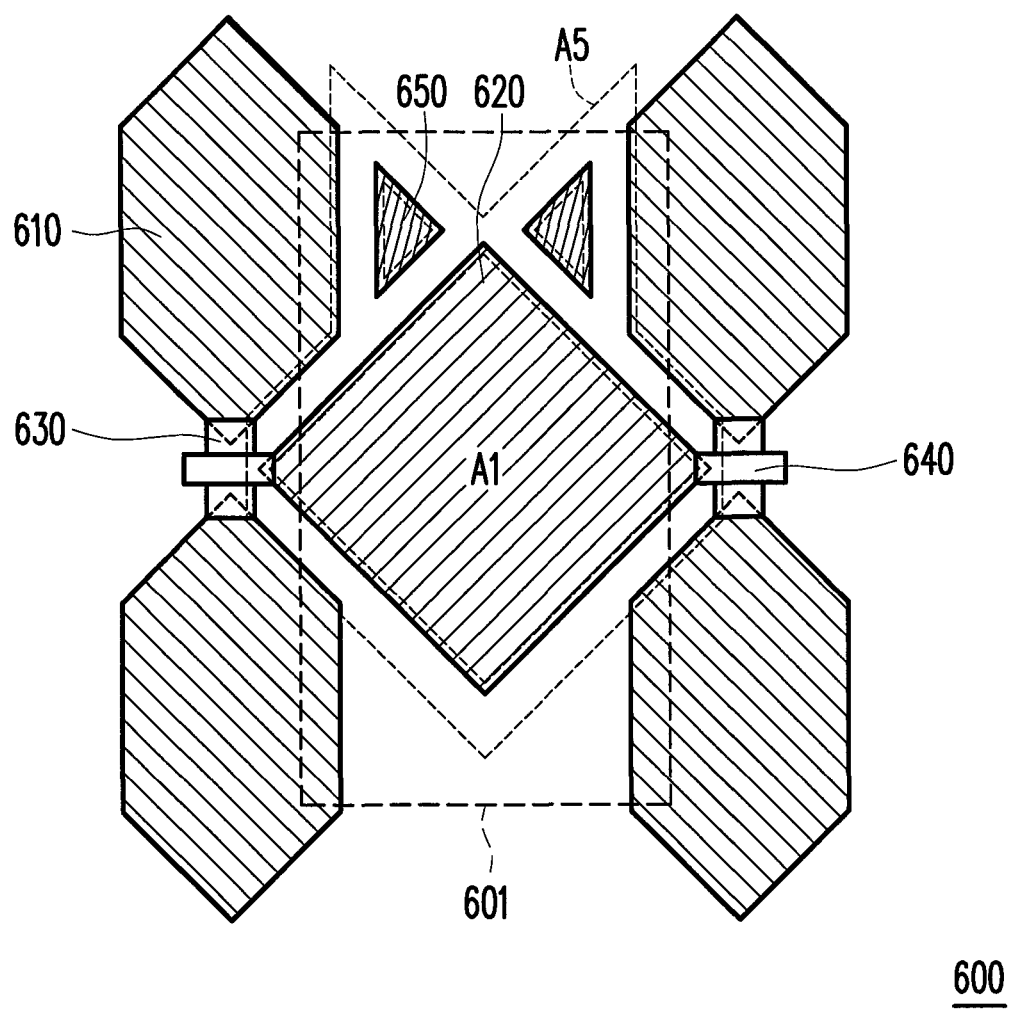
FIG. 6A is a schematic view of an electrode structure of a capacitive touch panel according to an embodiment of the invention.
Figure 6B:
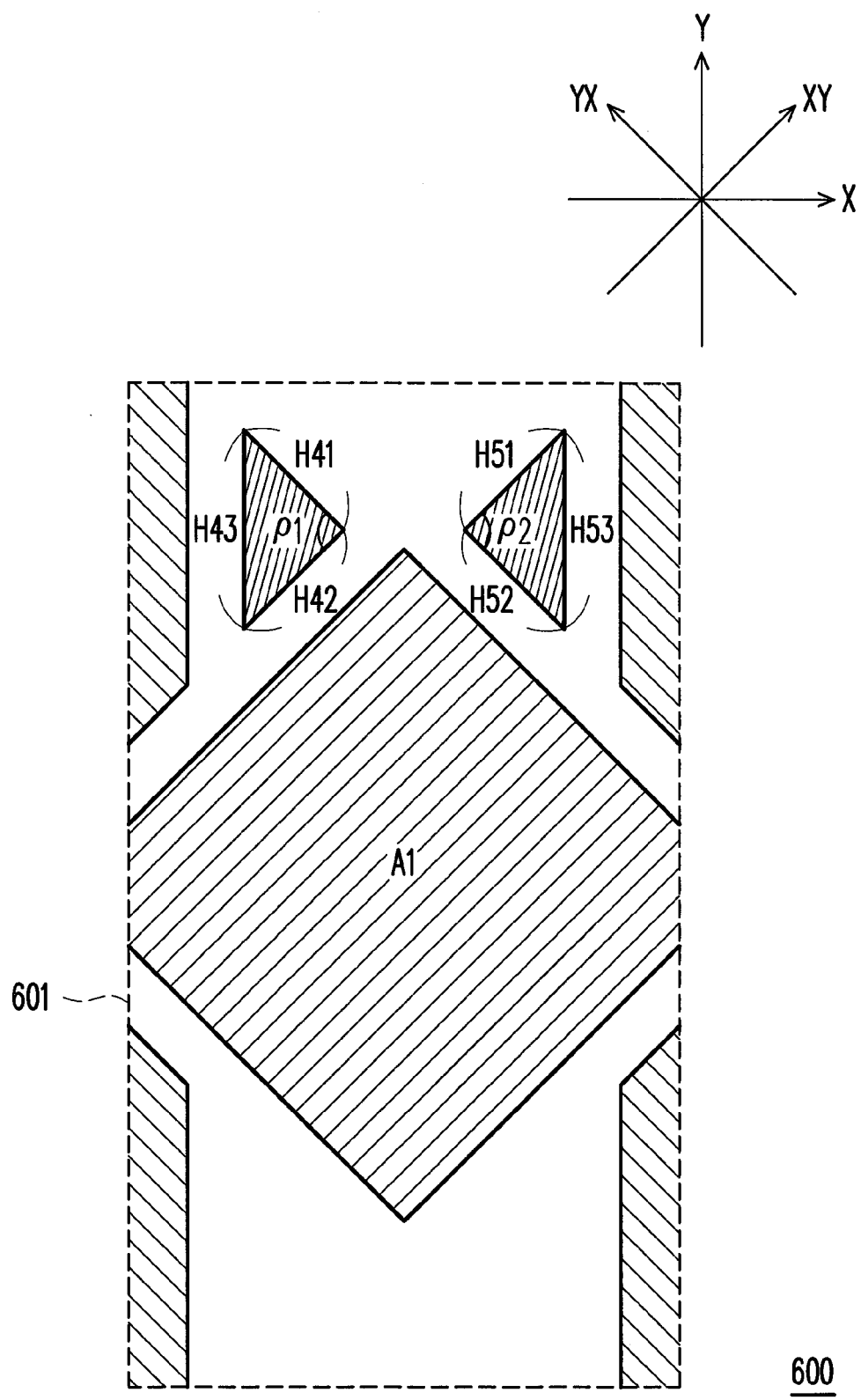
FIG. 6B is an enlarged schematic view of a region of the electrode structure of FIG. 6A.

FIG. 6A is a schematic view of an electrode structure of a capacitive touch panel according to an embodiment of the invention. FIG. 6B is an enlarged schematic view of a region of the electrode structure of FIG. 6A. With reference to FIG. 4A and FIG. 6A to FIG. 6B, an electrode pattern 600 of the touch panel of this embodiment is similar to the electrode pattern 400 of the second embodiment, and a difference between the electrode pattern 600 and the electrode pattern 400 mainly lies in that a driving electrode 620 of the electrode pattern 600 only includes two dummy electrodes 650 located on a top side of the driving electrode 620. It is noted that the top side of this embodiment is to describe the direction shown in the figures, which should not be construed as limitations to the invention.

More specifically, the electrode pattern 600 of this embodiment includes two dummy electrodes 650 that have substantially equal sizes. It is noted that the aforementioned number and size relationship of the dummy electrodes 650 should not be construed as limitations to the invention. Each of the dummy electrodes 650 of this embodiment has a trilateral electrode structure, and the area of each dummy electrode 650 is respectively smaller than the area of each receiving electrode 610 and the area of each driving electrode 620. Moreover, the dummy electrodes 650 are respectively insulated from the receiving electrodes 610 and the driving electrodes 620. The dummy electrodes 650 are disposed at least for increasing a coupling region A5, as shown in FIG. 6A, between the receiving electrodes 610, the driving electrodes 620, and the dummy electrodes 650.

In terms of the arrangement of sides, referring to FIG. 6B, FIG. 6B provides an enlarged schematic view of a region 601 of the electrode pattern 600. With reference to the two dummy electrodes 650, the sides of the two dummy electrodes, which are arranged in different directions, are substantially parallel in different directions. For example, in the X direction, the oblique sides H43 and H53 of the two dummy electrodes 650 are substantially parallel to each other; in the XY direction, the adjacent sides H41 and H52 are substantially parallel to each other; and in the YX direction, the adjacent sides H42 and H51 are substantially parallel to each other. In this embodiment, lengths of the four adjacent sides H41, H51, H42, and H52 of the dummy electrodes 650 are substantially equal to or different from each other; and lengths of the two oblique sides H43 and H53 of the dummy electrodes 650 are substantially equal to or different from each other. The invention does not limit these lengths.

From the aspect of angles, in the two dummy electrodes 650, an included angle ρ1 between the adjacent sides 1141 and H42 and an included angle ρ2 between the adjacent sides H51 and H52 are substantially equal to or different from each other. In the embodiment that the included angles ρ1 and ρ2 are equal to each other, the included angles are substantially equal to 90 degrees for example, but the invention is not limited thereto.

Figure 7:
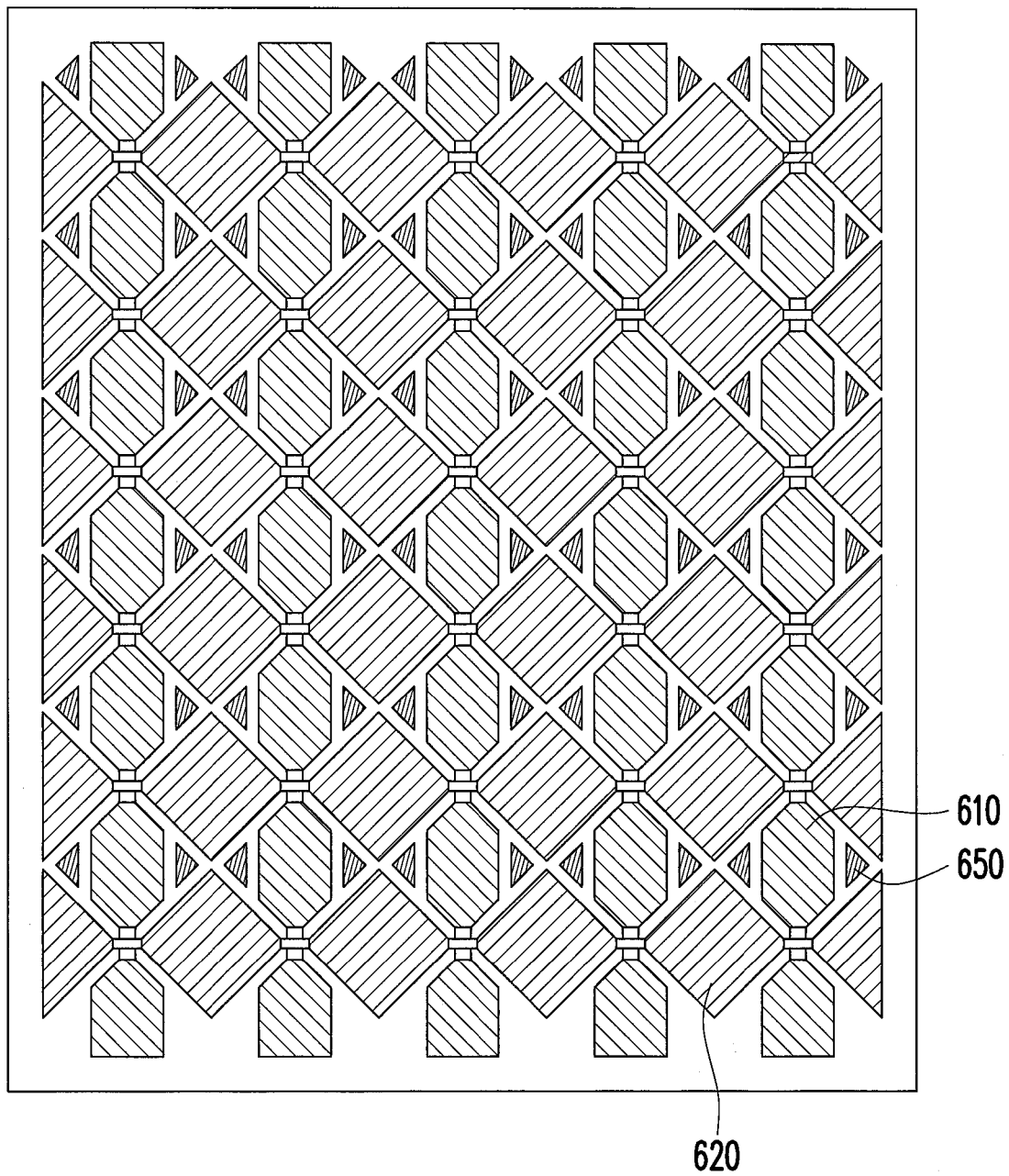
FIG. 7 is a schematic view of the electrode structure of FIG. 6A applied on a capacitive touch panel.

FIG. 7 is a schematic view of the electrode structure of FIG. 6A applied on a capacitive touch panel. Referring to FIG. 7, FIG. 7 depicts a capacitive touch panel that includes a group of 5×6 electrodes. The electrodes are divided into two regions, which are a driving region including a plurality of the driving electrodes 620 and a receiving region including a plurality of the receiving electrodes 610. In the driving region, six polygonal driving electrodes 620 are provided in a column as an example. The polygonal structure of each of the driving electrodes 620 is the same as the structure of the driving electrode 620 illustrated in FIG. 6A, and thus descriptions thereof are omitted hereinafter. In the receiving region, five hexagonal receiving electrodes 610 are provided in a row as an example. The hexagonal electrode structure of each of the receiving electrodes 610 is the same as the structure of the receiving electrode 610 illustrated in FIG. 6A, and thus descriptions thereof are omitted hereinafter. In this embodiment, each of the driving electrodes 620 has a rhombic electrode structure, for example, and a pair of the dummy electrodes 650 is disposed on the top side the driving electrode 620, so as to increase the coupling region A5 with the receiving electrodes 610. The area of the receiving electrode in the receiving region is reduced so as to decrease the noise of sensing signals.

To conclude the above, in the exemplary embodiments of the invention, the area of the receiving electrodes in the receiving region is reduced to decrease the noise of sensing signals. In the driving region, the area for the coupling of the driving electrodes and the receiving electrodes is increased to enhance the intensity of the input signals and further to improve the signal to noise ratio. In the exemplary embodiments of the invention, a method for increasing the coupling area includes adding the auxiliary regions to the driving electrodes or disposing multiple dummy electrodes around the driving electrodes.

Although the invention has been disclosed by the above embodiments, they are not intended to limit the invention. It will be apparent to those of ordinary skill in the art that modifications and variations to the invention may be made without departing from the spirit and the scope of the invention. Accordingly, the protection scope of the invention falls in the appended claims.

What is claimed is:

1. An electrode structure of a capacitive touch panel, the electrode structure comprising:
    a plurality of receiving electrodes, each of which comprises a hexagonal electrode structure; and
    a plurality of driving electrodes, each of which comprises a main region having a quadrilateral electrode structure,
    wherein the area of each of the driving electrodes is larger than the area of each of the receiving electrodes.

2. The electrode structure of claim 1, wherein sides of each receiving electrode, which are arranged in the same direction, are substantially parallel.

3. The electrode structure of claim 1, wherein sides of the main region of each driving electrode, which are arranged in the same direction, are substantially parallel.

4. The electrode structure of claim 1, wherein the main region of each driving electrode comprises four included angles, each of which is substantially equal to 90 degrees.

5. The electrode structure of claim 1, wherein sides of each receiving electrode and sides of the main region of each driving electrode, which are arranged in the same direction, are substantially parallel.

6. The electrode structure of claim 1, wherein each of the receiving electrodes comprises a plurality of long sides and a plurality of short sides, and an included angle between two adjacent short sides of each receiving electrode is smaller than or equal to 90 degrees.

7. The electrode structure of claim 6, wherein an included angle between the adjacent long side and short side of each receiving electrode is larger than 90 degrees.

8. The electrode structure of claim 1, further comprising:
    a plurality of dummy electrodes, each of which comprises a trilateral electrode structure, wherein the area of each of the dummy electrodes is smaller than the area of each of the receiving electrodes and the area of each of the driving electrodes.

9. The electrode structure of claim 8, wherein sides of each dummy electrode, which are arranged in the same direction, are substantially parallel to each other.

10. The electrode structure of claim 9, wherein the sides of each receiving electrode, sides of the main region of each driving electrode, and sides of each dummy electrode, which are arranged in the same direction, are substantially parallel.

11. The electrode structure of claim 10, wherein an included angle between two adjacent sides of each dummy electrode is substantially equal to 90 degrees.

12. The electrode structure of claim 10, wherein the dummy electrodes are respectively insulated from the receiving electrodes and the main regions of the driving electrodes.

13. The electrode structure of claim 1, wherein each of the driving electrodes further comprises:
    a plurality of auxiliary regions, each of which comprises a trilateral electrode structure.

14. The electrode structure of claim 13, wherein sides of the auxiliary regions of the driving electrodes, which are arranged in the same direction, are substantially parallel.

15. The electrode structure of claim 13, wherein the sides of the auxiliary regions of the driving electrodes and sides of the main regions of the driving electrodes, which are arranged in the same direction, are substantially parallel.

16. The electrode structure of claim 13, wherein an included angle between two adjacent sides of each auxiliary region of the driving electrodes is substantially equal to 90 degrees.

* * * * *